Nov. 21, 1933.  W. W. CARSON, JR  1,936,326
AIR CONDITIONING APPARATUS
Filed Jan. 25, 1932   3 Sheets-Sheet 1
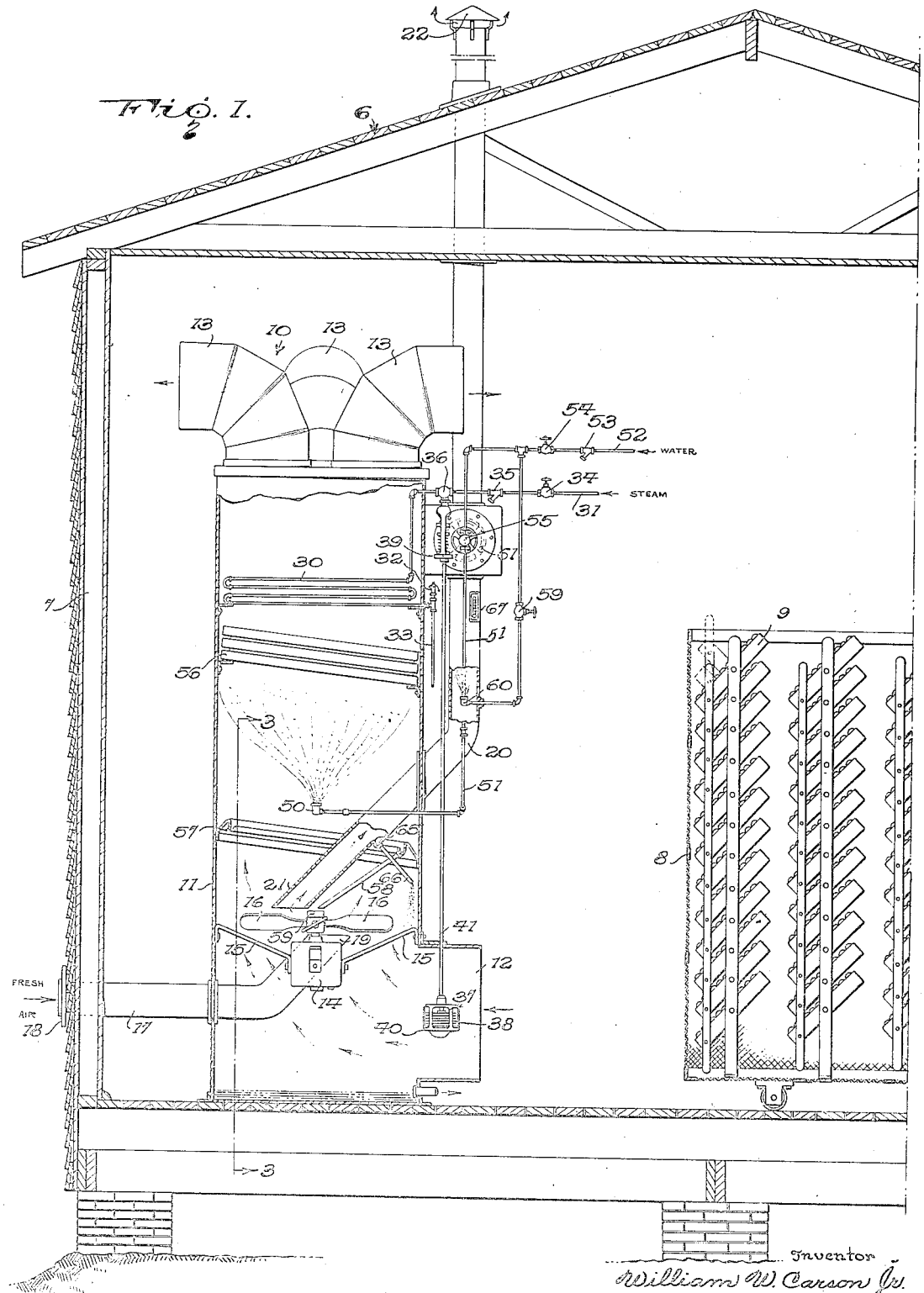

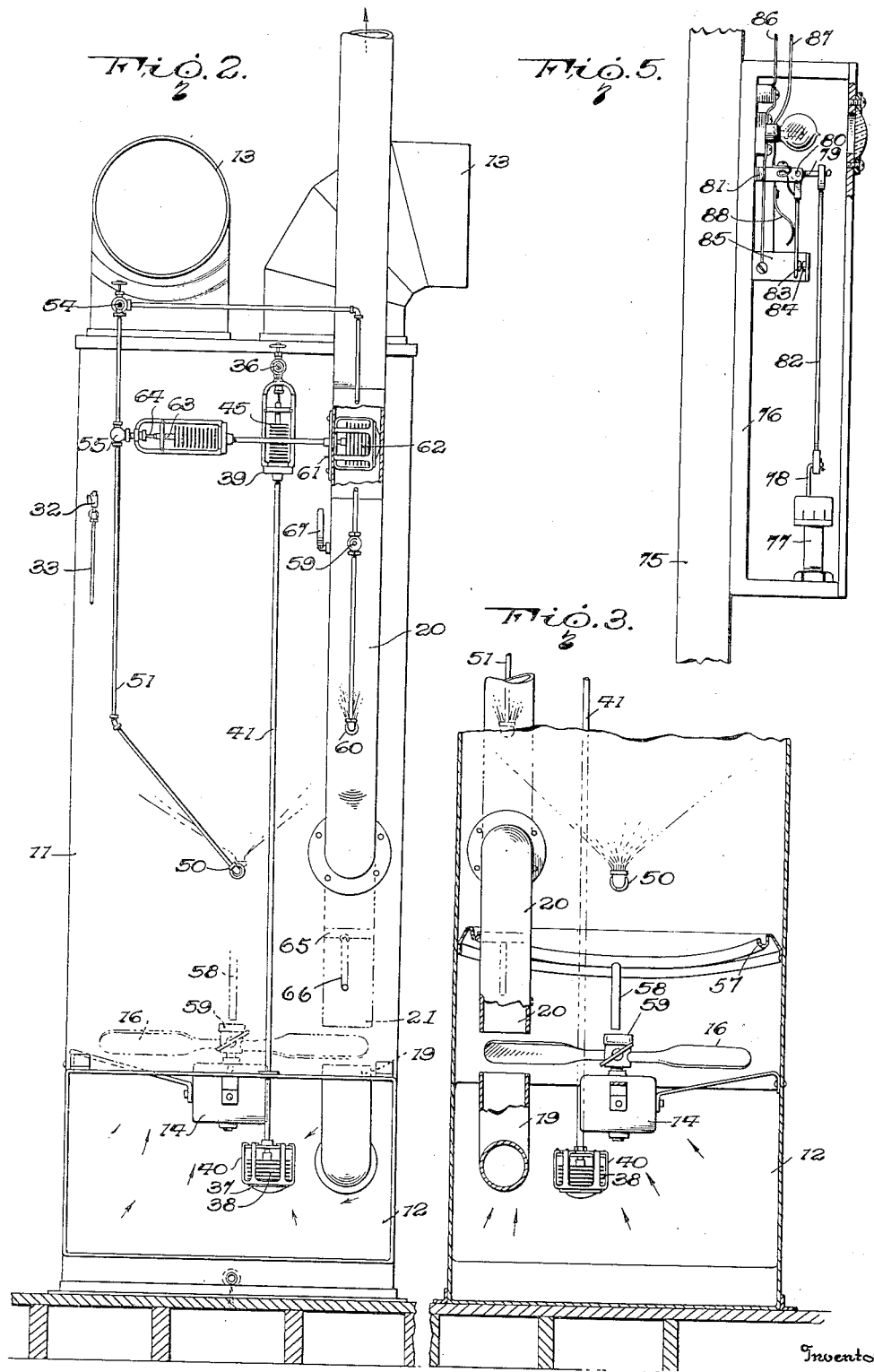

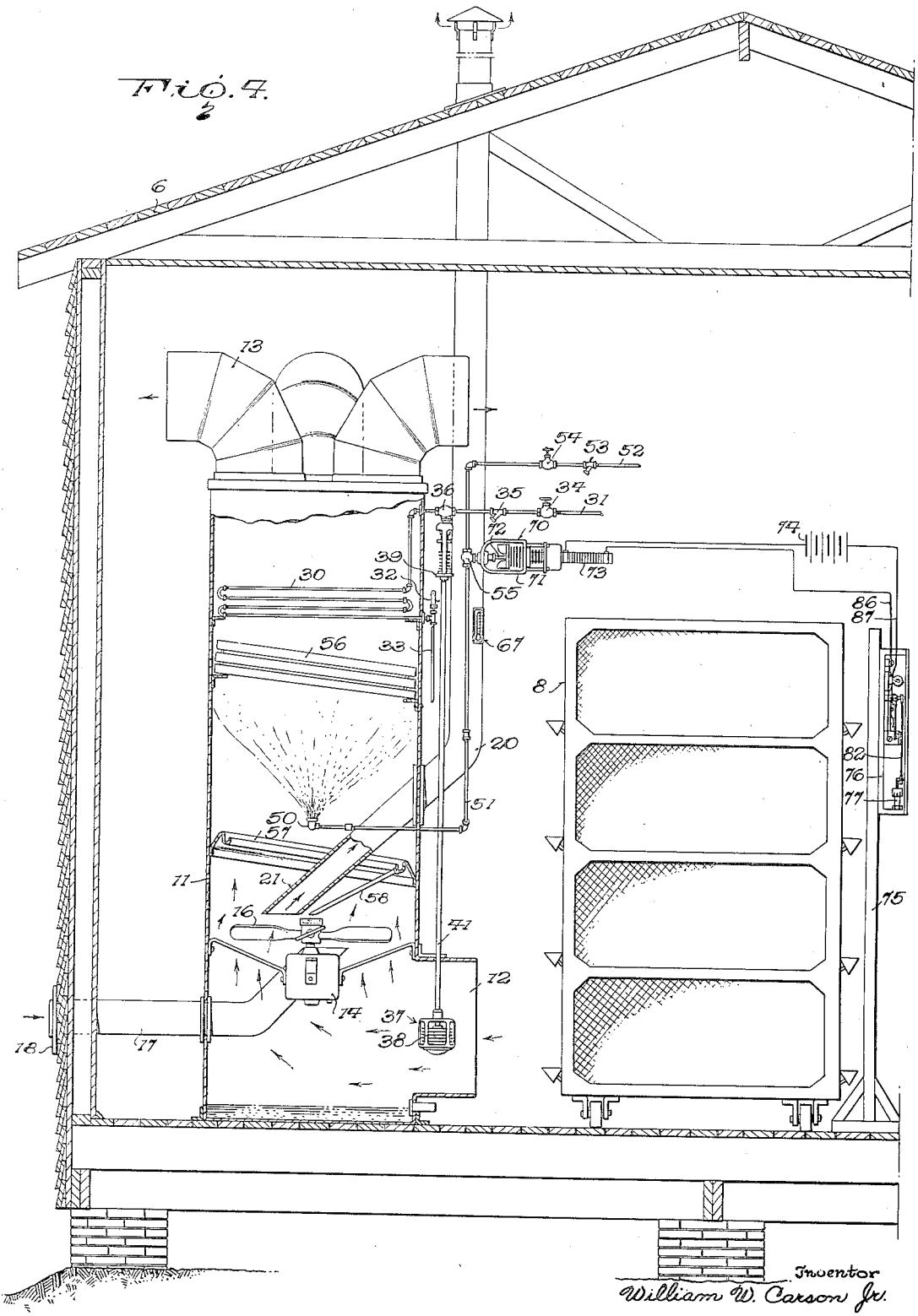

Patented Nov. 21, 1933

1,936,326

UNITED STATES PATENT OFFICE 1,936,326

AIR CONDITIONING APPARATUS

William W. Carson, Jr., Knoxville, Tenn., assignor to The Fulton Sylphon Company, Knoxville, Tenn., a corporation of Delaware Application January 25, 1932. Serial No. 588,803

22 Claims. (Cl. 257—2)

This invention relates to an air conditioning apparatus and more particularly to air conditioning for incubators, brooders, and like apparatus where close regulation of temperature and relative humidity must be maintained.

One of the objects of the present invention is to provide a novel air conditioning apparatus in which the temperature and relative humidity of the air is maintained substantially constant.

Another object of the present invention is to provide a novel air conditioning apparatus for an incubator or the like which circulates the air and varies its temperature and relative humidity to maintain the temperature and relative humidity in the incubator or like enclosure substantially constant.

Another object of the present invention is to provide a novel air conditioning apparatus for an incubator or the like which circulates the air, adds fresh air at a constant rate, exhausts part of the circulated air at a constant rate, and maintains the air in the incubator or like enclosure at a substantially constant temperature and relative humidity.

Another object of the present invention is to provide a novel air conditioning apparatus for an incubator or the like which proportionately increases the moisture content of the air in accordance with the degree of depression in temperature of a sample of the air saturated with water vapor.

Another object of the present invention is to provide a novel air conditioning apparatus for an incubator or the like in which a single fan circulates the air, draws in fresh air at a constant rate, and exhausts part of the circulated air at a constant rate without exhausting any of the fresh air.

Another object of the present invention is to provide a novel air conditioning apparatus for an incubator or the like which is simple, compact, and efficient for the purpose intended.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Fig. 1 is a side elevational view in section of an incubator or brooder housing and the air conditioning apparatus incorporating the present invention;

Fig. 2 is a side elevational view partly in section of the air conditioning apparatus shown in Fig. 1 taken at right angles to the view in Fig. 1;

Fig. 3 is a side elevational view in section of the air conditioning apparatus disclosed in Fig. 1 and taken on line 3—3 of Fig. 1;

Fig. 4 is a side elevational view in section of an incubator or brooder house similar to Fig. 1 but including a different embodiment of air conditioning apparatus from that shown in Fig. 1; and Fig. 5 is a detailed view of the control mechanism for the thermostatic water valve of the air conditioning apparatus shown in Fig. 4.

In Fig. 1 a housing 6 of an incubator, brooder or a like enclosure is illustrated, having an insulated wall construction 7 which may be either hollow or filled with any suitable insulating material for preventing the transmission of heat. For purposes of illustration a truck 8 is shown within the housing carrying suitable egg cases or pans 9 but any material may be substituted which it is desired to treat. Also within the housing 6 a self-contained air conditioning unit is provided and indicated generally at 10, for circulating the air through the housing, adding fresh air at a constant rate, exhausting part of the circulated air at a constant rate to the outside of the apparatus, and maintaining the temperature and relative humidity of the air circulated substantially constant.

This air conditioning apparatus is so constructed as to form a flue for receiving air at the bottom and discharging air at the top and is illustrated as a hollow cylinder 11 having an air inlet 12 at the bottom and a plurality of movable outlet conduits 13 at the top for properly directing the discharged air. Within the flue formed by the cylindrical casing 11, a blower is provided adjacent the lower end but above the air inlet 12. This blower unit includes an electric motor 14 suspended in the casing 11 by means of brackets 15, and a fan directly connected to the armature shaft of the motor and having radial blades 16 curved in an axial direction. This blower unit is adapted to be manually controlled from the outside of the housing and is preferably provided with a control box (not shown) for varying the speed of the motor.

For introducing fresh air into the housing a conduit 17 is provided which extends from the outside of the housing as at 18 through the casing wall 11 of the flue and terminates at a point directly below the fan blade 16 adjacent the outer periphery of the fan, the end 19 of the conduit 17 being cut at an angle to maintain closer proximity to the fan blade. A second conduit 20 is provided for exhausting a part of the circulated air at a constant rate and has an end 21 terminating adjacent the fan on the side of the fan opposite from the end of the conduit 19 but spaced from the end 19 to the left as illustrated in the drawings. This conduit 20 then extends outwardly through the wall 11 of the flue and then upwardly out of the housing 6, terminating in a ventilator cap 22 for preventing rain or wind from entering the conduit. With the flue, blower, and conduits thus far described rotation of the fan blade 16 in a clockwise direction as viewed from the top in the drawings will draw the air within the housing 6 into the flue through the inlet 12 and in addition a continuous stream of fresh air from outside the housing 6 through the conduit 17 and force the same upwardly through the flue and outlet conduits 13 to the interior of the housing 6. The fan will also force a continuous stream of the circulated air into the conduit 20 which will be exhausted outside of the housing 6, but the construction and arrangement of the ends 19 and 21 of the conduits 17 and 20, respectively, will prevent any of the fresh air drawn in by the fan from being discharged through the conduit 20 as the fan travels approximately 360° from the time it leaves the end of the conduit 19 until it approaches the end of the conduit 21.

The temperature within the housing 6 is maintained substantially constant at all times as the hatching of eggs in an incubator or brooding chickens require such a condition. To this end a heat exchanger is provided in the flue 11 and is illustrated in the form of a heating coil 30 for circulating a heating medium such as steam supplied from a pipe line 31. This coil 30 is so constructed and arranged as to entirely cover the area of the flue so that the entire column of air will be effected by the coil. The coil is also provided with an air valve 32 for exhausting any air trapped in the coil and a drain pipe 33 for the waste condensate. In the supply line 31 for the heating medium a stop valve 34 and a strainer device 35 are provided together with a control valve 36 adapted to be actuated in accordance with the temperature of the air in the housing to control the amount of heating medium allowed to circulate in the coil 30. This control valve in effect controls the temperature of the air leaving the outlets 13 of the flue 11.

The mechanism for actuating the control valve 36, more clearly illustrated in Fig. 2, includes a thermostat 37 positioned in the air inlet 12 of the flue 11 and therefore subjected to the temperature of the air in the housing 6. This thermostat 37 is illustrated as an expansible and contractible bellows 38 which may be suspended from the valve member 36 by a frame 39. Bellows 38 is protected by a cage 40 and has an operating connection at 41. Said bellows is charged with a volatile fluid which when expanded by increases in temperature transmits its motion to the valve 36. Within the frame 39 a spring 45 may be provided for properly adjusting the thermostat. This thermostat is very sensitive to temperature changes and is accurately responsive to a few degrees change in temperature. With this construction the temperature of the air leaving the outlets 13 is controlled by the thermostat and heat exchanger in accordance with the temperature of the air in the housing 6 to maintain the same substantially constant.

In incubators, brooders or like apparatus it is also essential that the relative humidity be maintained substantially constant if the best results are to be obtained. To this end means are provided in the apparatus for increasing the moisture content of the air, including a spray nozzle 50 positioned in the flue 11 between the blower unit and the heating coil 30. This spray nozzle 50 is connected by means of pipe line 51 to a supply line 52 having a filter 53, a stop valve 54, and a control valve 55 adapted to be actuated in accordance with the depression in temperature of a sample of air in the housing 6 saturated with water vapor. Above the spray nozzle 50 suitable baffles 56 are provided for removing all water held in mechanical suspension before passing over the heating coil 30. Below the spray nozzle 50 an annular trough 57 is provided for collecting the surplus water ejected from the spray. The water so collected is directed by means of a tube 58 onto a cup 59 formed in the hub of the fan and which will be thrown out and mixed with the air by the fan blades 16.

For controlling the amount of water supplied to the spray nozzle 50 in accordance with the relative humidity of the air in the housing 6, the air forced out through the exhaust conduit 20, which is a true sample of the air within the housing 6, is saturated with water vapor by means of a spray nozzle 60 positioned in the exhaust conduit. The depression in temperature, due to the heat of evaporation being abstracted from the air itself, will vary directly with the amount of water evaporated or in other words the degree of depression in temperature will vary inversely with the relative humidity of the air in the housing. For purposes of further description and in the claims this temperature of the air in the conduit 20 which is saturated with water vapor will be hereinafter referred to as the wet bulb temperature. Above the spray nozzle 60 and within the conduit 20 a thermostat 61 is positioned and directly subjected to the temperature of the exhaust air saturated with water vapor. This thermostat 61 may be similar to the thermostat 37 already described and as shown includes a bellows 62 for actuating a rod 63 which in turn is directly connected with the operating element 64 of the valve 55 but distinguishes from the previously described thermostat in that decreases in temperature will open the valve to allow more water to be ejected from the spray nozzle 50 to increase the moisture content of the air as a decrease in the wet bulb temperature indicates a comparatively low relative humidity. Below the spray nozzle 60, a recess 65 is formed in the conduit 20 for catching the excess water from the nozzle which is drained through a pipe 66. A thermometer 67 is also provided in the conduit 20 having an index on the exterior of the conduit 20 for visual indication of the temperature in the conduit.

The operation of this device is as follows. To start the apparatus in operation the blower unit is energized by suitable control mechanism (not shown), the steam stop valve 34 is opened, the water stop valve 54 is opened, and the stop valve 59 to the auxiliary spray nozzle 60 is opened. The fan blades 16 of the blower unit rotating in a clockwise direction as viewed from the top in Fig. 1 will draw air into the flue 11 through inlet 12 from the enclosure within the housing, and force the same upwardly through the flue and outlets 13 to maintain a constant circulation of air within the housing 6. The fan will also draw in a constant supply of fresh air through the conduit 17 and exhaust part of the circulated air at a constant rate through the conduit 20, but as the ends 19 and 21 of the inlet and outlet conduits 17 and 20 respectively are spaced from each other in the direction of rotation of the fan blades substantially 360°, the fresh air drawn in through the conduit 17 will not be mixed with the air exhausted through the conduit 20. This circulated air forced outward through the conduit 20 being a true sample of the air within the housing 6, is subjected to the curtain of water forced from the spray nozzle 60 within this conduit to cause the same to be completely saturated with water vapor. This saturation, as previously explained, is caused by evaporation which takes the heat from the air itself and depresses the temperature, the amount of evaporation and depression in temperature being directly dependent upon the relative humidity of the sample of air. The thermostat 61 positioned in the exhaust conduit 20 and above the spray nozzle 60 is subjected to this depressed temperature and is therefore responsive to the relative humidity of the air in the housing for controlling the valve 55 and the amount of water supplied from the spray nozzle 50. The air being forced upward through the flue 11 by the fan blade 16 is caused to pass through the curtain of water ejected from the spray nozzle 50 which increases its moisture content and therefore the relative humidity, and also washes the air. The thermostat 61 and the valve 55 are so constructed and arranged that the amount of water ejected from the nozzle 50 will be varied inversely with the wet bulb temperatures until a static condition is reached at which the water ejected will maintain the relative humidity in the housing constant. Above the spray nozzle 50, baffle plates 56 will remove any water held in mechanical suspension in the air, which together with any excess from the spray nozzle itself will run down the sides of the flue 11 and be collected in the annular trough 57, which is drained through pipe 58 to the cup 59 at the axis of the fan, and subsequently thrown out by the fan into the column of moving air.

After leaving the baffle plates 56 the column of moving air directly impinges upon the heating coil 30 which maintains the temperature of the air within the housing 6 substantially constant. The amount of heat which is transferred from the heating medium within the coil 30 to the moving column of air in the flue 11 and the degree of increase in temperature of the column of air is regulated by the thermostat 37 positioned in the air inlet 12 and therefore subjected to the actual temperature of the air in the housing 6. This thermostat 37 being connected to the valve 36 controls the flow of the heating medium, such as steam, through the heating coil 30 and a very slight degree of increase in the temperature above the normal temperature at which the air is to be maintained will entirely close the valve 36 preventing any of the heating medium from flowing through the coil. On the other hand, only a slight decrease in temperature below the normal temperature will cause the valve 36 to be entirely opened to allow a large transfer of heat and increase in temperature of the air in the moving column. The thermostat 37 being very sensitive and quickly responsive to temperature changes will accurately regulate the heat transfer of the heat exchanger and will maintain the air temperature within the housing 6 substantially constant.

In the embodiment of the invention shown in Figs. 4 and 5 the same general arrangement of elements is present as described with respect to the embodiment shown in Fig. 1 in so far as the flue, blower unit, fresh air conduit, exhaust air conduits, spray nozzle, baffles, heat exchanger and control elements for the heat exchanger are concerned, but a different control mechanism is provided for varying the amount of water ejected from the spray nozzle 50 in accordance with variations in the relative humidity. This novel control mechanism includes a thermostat 70 having a frame 71 supported by the casing of the valve 55 and actuating mechanism 72 for the valve mechanism. This thermostat 70 is of the off-and-on type in which the moving element 72 closes the valve mechanism 55 when the thermostat is heated, but opens the valve when subjected to the ambient temperature. The regulating mechanism for the thermostat comprises a heating coil 73 surrounding the thermo-sensitive element of the thermostat, and a source of electrical energy illustrated as a battery 74, and a circuit closing mechanism actuated by the relative humidity of the air in the housing.

The circuit closing mechanism more clearly shown in Fig. 5 is positioned within the housing 6 remote from the flue 11 and subjected to the actual conditions of the air within the housing. This circuit closing mechanism is mounted on a stanchion 75 remote from the flue 11 and includes a U-shaped bracket frame 76 attached to the stanchion 75. On one leg of the bracket 76 an adjustable abutment 77 is provided having an extended finger 78. Spaced from the finger 78 a second finger 79 is provided forming one arm of a bell crank lever which is pivoted at 80 on a post 81 fixed to the bracket 76. Between the two fingers 78 and 79 a membrane 82 is stretched and attached to the fingers by suitable connecting means. This membrane contracts when dry and expands when wet, the degree of expansion being directly proportional to the percentage of moisture content in the air, or in other words, to the relative humidity. On the other arm of the bell crank lever formed with the finger 79, an electrical contact 83 is provided adapted to cooperate with a contact 84 supported on a bracket 85 extending from bracket 76. Suitable electrical connections 86 and 87 extend from the contacts 83 and 84 to the heating coil and battery to form a circuit so that when the contacts are closed an electrical circuit is completed through the heating coil 73 for actuating the thermostat and closing the water valve 55. A spring 88 is fixed between the bracket 76 and the arm of the bell crank lever carrying the contact 83 for tensioning the membrane and holding it in its expanded condition.

With this embodiment of the invention, as long as the relative humidity of the air in the housing 6 remains above a predetermined minimum the membrane 82 will be extended and the spring 87 moves the contact 83 into engagement with the contact 84 and a continuous circuit is maintained through the heating coil 73 and battery 74 for actuating the water valve 55 to hold the same closed. However, when the relative humidity decreases below the predetermined minimum the membrane 82 contracts and moves the contact 83 out of engagement with the contact 84 against spring 87 and opens the electric circuit which allows the valve mechanism 55 to open and a spray of water to be ejected from the nozzle 50. This spray from the nozzle 50 will increase the moisture content of the air moving through the flue 11 and increase the relative humidity to the desired point, at which time the membrane 82 will have so extended as to allow the contacts 83 and 84 to again engage and close the circuit to the heating coil 73 and again close the valve mechanism 55.

It will be apparent from the description and drawings that there has been provided a simple and efficient air conditioning mechanism for use in incubators, brooders, or the like, where a close regulation of both temperature and relative humidity must be maintained. Further, it will be apparent that with this construction the air is conditioned in the flue both as to its temperature and relative humidity in accordance with the actual conditions of the air within the housing 6 thereby allowing the maintenance of proper temperature and relative humidity at all times.

It will also be apparent to those skilled in the art that the invention is not limited to the form shown and described and that various substitutions of elements for those shown may be made without departing from the spirit of the invention. For instance, a different form of blower unit could be used in place of that shown, and other forms of thermostats from those illustrated could be used, and the various elements could have other shapes and sizes from those illustrated without departing from the spirit of the invention. Further, the air conditioning apparatus is not limited to use with incubators or brooders but could as well be used with other enclosures in which the temperature and relative humidity must be closely regulated as in drying kilns or the like. Reference is therefore to be had to the appended claims for a definition of the limits of the invention.

What is claimed is:

1. In an incubator or a like apparatus, a flue for conditioning the air in said apparatus, means for circulating the air through said apparatus and said flue, a conduit for adding fresh air to said flue, a conduit for exhausting part of the air from said flue to the outside of the apparatus, a nozzle in the flue for producing a spray through which the air must pass to increase its moisture content, a spray nozzle in the exhaust conduit for saturating the exhaust air with water vapor, and a thermostat in the path of the saturated air for controlling the amount of water sprayed in the flue in accordance with the wet bulb temperature of the air in the apparatus.

2. In an incubator or a like apparatus, a flue for conditioning the air in said apparatus, means for circulating the air through said apparatus and said flue, a nozzle in the flue for producing a spray through which the air must pass to increase its moisture content, a conduit for exhausting part of the circulated air from the flue to the outside of the apparatus, a spray nozzle in the exhaust conduit for saturating the exhaust air with moisture, a thermostat in the path of the water saturated air for controlling the amount of water sprayed in the flue, and means controlled by the temperature of the air entering the flue for heating the air in said flue.

3. In an incubator or like apparatus, means for conditioning the air in the apparatus, a plurality of conduits and a blower fan located adjacent the end of each of said conduits for circulating the air through the apparatus and conditioning means, drawing fresh air into the apparatus through one conduit and exhausting part of the circulated air from the apparatus through the other conduit.

4. In an incubator or like apparatus, a flue for conditioning the air in said apparatus, a fresh air conduit, an exhaust air conduit and a blower fan in said flue located adjacent the inner end of each of said conduits and so constructed and arranged as to circulate the air through the apparatus and the flue, draw air into the flue through the fresh air conduit, and exhaust part of the circulated air from the flue and apparatus through the exhaust conduit.

5. In an incubator or like apparatus, a flue for conditioning the air in said apparatus, a heat exchanger in said flue, a humidifying means in said flue, a plurality of conduits extending into said flue and a blower fan in said flue located adjacent the inner end of each of said conduits for circulating the air through said apparatus and said flue, drawing fresh air into the flue through one conduit, and exhausting part of the circulated air from the flue and apparatus through the other circuit.

6. In an incubator or like apparatus, a flue in said apparatus having an air inlet at the bottom and an air outlet at the top, a blower fan for circulating the air in the apparatus by drawing air through the inlet and forcing the same through the outlet of the flue, a conduit extending from the outside of the apparatus to a position on the suction side of the fan for adding fresh air to the apparatus at a constant rate, and a second conduit extending from a point on the pressure side of the fan spaced from the first named conduit for exhausting circulated air from the apparatus at a constant rate.

7. In an incubator or like apparatus, a flue for conditioning the air in said apparatus, having an air inlet at the bottom and an air outlet at the top, a blower fan adjacent the air inlet of the flue for circulating the air through the apparatus and flue, a conduit extending from outside of the apparatus to a position on the suction side of the fan, a second conduit extending from a position adjacent the blower side of the fan, but spaced from the first named conduit, to a position outside of the apparatus, a humidifying means in said flue, and a heat exchanging device in said flue, the blower fan, flue and conduits being so constructed and arranged that the air is constantly circulated through the apparatus with fresh air being added at a constant rate and the circulated air being exhausted at a constant rate but without any of the added fresh air being exhausted.

8. In an incubator or like apparatus, a flue for conditioning the air in said apparatus, a fan in said flue rotating about an axis wholly within said flue for circulating the air through said apparatus and said flue, a spray nozzle in said flue above said fan for producing a spray of water through which the air must pass to increase its moisture content, and means for collecting the surplus water from said spray and directing it onto the rotating fan.

9. In an incubator or like apparatus, a flue for conditioning the air in said apparatus, a fan in said flue adapted to rotate at right angles to the axis of the flue for circulating the air through said apparatus and said flue, a spray nozzle in said flue above said fan for producing a spray of water through which the air must pass to increase its moisture content, a trough in said flue for collecting the surplus water from said spray, and a tube for directing the water from the trough onto the hub of said fan to be forced out into the column of air by centrifugal force from said fan.

10. In an incubator or a like apparatus, means for removing a sample of the air from the apparatus, means for adding moisture to the air in the apparatus, and means actuated by the wet bulb temperature of the air of said sample for controlling the amount of moisture added to the air to maintain the moisture content substantially constant.

11. In an incubator or like apparatus, means for circulating the air in said apparatus, means for removing a sample of the air from the apparatus, means for saturating said sample of air, means for adding moisture to the air in the apparatus, and means actuated by the wet bulb temperature of the air of said sample for controlling the amount of moisture added to the air and maintaining the moisture content substantially constant.

12. In an incubator or like apparatus, means for circulating the air in said apparatus, means for adding fresh air to the apparatus, means for exhausting part of the circulated air, means for maintaining the temperature of the air in the apparatus substantially constant, and means actuated by the wet bulb temperature of the air in the exhausting means for maintaining the moisture content substantially constant.

13. In an incubator or like apparatus, means for circulating the air in said apparatus, means for adding fresh air to the apparatus, means for exhausting part of the circulated air, means for maintaining the temperature of the air in the apparatus substantially constant, means for increasing the moisture content of the air in the apparatus, means for saturating the exhaust air with moisture, and a thermostat subjected to the temperature of the saturated exhaust air for controlling the means for adding moisture to the air.

14. In an incubator or like apparatus, a self-contained unit within said apparatus for conditioning the air in said apparatus and including a flue having an inlet and an outlet opening into said apparatus, means for circulating the air through said apparatus and said flue, a heat exchanger in said flue for heating the air, and a thermostat positioned in said flue in the path of the air entering the flue for controlling the heat exchanger and the temperature of the air leaving the flue.

15. In an incubator or like apparatus, a self-contained unit within said apparatus for conditioning the air in said apparatus and including a flue having an inlet and an outlet opening into said apparatus, means for circulating the air through said apparatus and said flue, means for adding fresh air to the flue, means for exhausting part of the circulated air from the flue to the outside of the apparatus, a heat exchanger within the flue, and a thermostat positioned in said flue in the path of the air entering the flue for conditioning the heat exchanger and controlling the temperature of the air leaving the flue and flowing into the apparatus.

16. In an incubator or like apparatus, a self-contained unit within said apparatus for conditioning the air in said apparatus and including a flue having an inlet and an outlet opening into said apparatus, means for circulating the air through said apparatus and said flue, and means controlled by the wet bulb temperature of the air in the apparatus for adding moisture to the air in said flue.

17. In an incubator or like apparatus, a self-contained unit within said apparatus for conditioning the air in said apparatus and including a flue having an inlet and an outlet opening into said apparatus, means for circulating the air through said apparatus and said flue, means for heating the air in said flue, a thermostat in the flue in the path of the air entering the flue for controlling the effect of said heating means, and means controlled by the wet bulb temperature of the air in the apparatus for adding moisture to the air in said flue.

18. In an incubator or like apparatus, a self-contained unit within said apparatus for conditioning the air in said apparatus and including a flue having an inlet and an outlet opening into said apparatus, means for circulating the air through said apparatus and said flue, means for withdrawing part of the air from said flue and discharging the same exteriorly of said apparatus, and means controlled by the wet bulb temperature of the air in said air-withdrawing means for adding moisture to the air in said flue.

19. In an incubator or like apparatus, a self-contained unit within said apparatus for conditioning the air in said apparatus and including a flue having an inlet and an outlet opening into said apparatus, means for circulating the air through said apparatus and said flue, means in the flue controlled by the temperature of the air entering the flue for heating the air in said flue, means for withdrawing part of the air from said flue and discharging the same exteriorly of said apparatus, and means controlled by the wet bulb temperature of the air in said air-withdrawing means for adding moisture to the air in said flue.

20. In an incubator or a like apparatus, a flue for conditioning the air in said apparatus, means for circulating the air through said apparatus and said flue, a spray nozzle in the flue for producing a curtain of water through which the air must pass to increase its moisture content, a conduit for leading air from said apparatus, means for saturating the air in said conduit, a thermostat subjected to the wet bulb temperature of the air in said conduit and controlling the amount of water ejected from the spray nozzle, and means for heating the air in said flue.

21. In an incubator or like apparatus, a flue for conditioning the air in the apparatus, a fan for circulating the air through the apparatus and flue, a spray nozzle for producing a spray of water through which the air must pass, means for regulating the amount of water ejected from the spray nozzle, and means for admitting fresh air to said apparatus and exhausting stale air from said apparatus including a pair of conduits extending into said flue and into adjacency with said fan but having their openings out of alignment.

22. In an incubator or like apparatus, a flue for conditioning the air in the apparatus, a spray nozzle for producing a spray of water through which the air must pass, means for controlling the spray nozzle, means for heating the air after it has passed through said spray nozzle, means for controlling said heating means, a fan for circulating the air through said apparatus and flue, and means for admitting fresh air to said apparatus and exhausting stale air from said apparatus including a pair of conduits extending into said flue and into adjacency with said fan but having their openings out of alignment.

WILLIAM W. CARSON, JR.